United States Patent [19]

Veneria

[11] 3,724,802

[45] Apr. 3, 1973

[54] PLASTICS MOULDING PRESSES

[75] Inventor: Giovanni Bessolo Veneria, Ivrea, Italy

[73] Assignee: Ing. C. Olivetti & C.S.p.A., Ivrea, Italy

[22] Filed: Sept. 3, 1971

[21] Appl. No.: 177,607

[30] Foreign Application Priority Data

Sept. 18, 1970 Italy..................................70145 A/70

[52] U.S. Cl. ....................249/67, 425/242, 425/443, 425/DIG. 51

[51] Int. Cl. ................................................B28b 7/10

[58] Field of Search ..249/67, 68, 161; 425/242, 443, 425/444, DIG. 51

[56] References Cited

UNITED STATES PATENTS

| 2,372,177 | 3/1945 | Conner | 425/DIG. 51 |
| 2,494,777 | 1/1950 | Patterson et al. | 425/DIG. 51 |
| 3,508,299 | 4/1970 | Ahern | 425/DIG. 51 |

*Primary Examiner*—H. A. Kilby, Jr.
*Attorney*—Harold J. Birch et al.

[57] ABSTRACT

A moulding press has a series of hollow guide bolts, each connected at one end to a plate of the press and having a head defining the maximum distance of another plate that slides on the bolt. A pin is contained slidably in the bolt and has transverse spikes protruding through longitudinal slots in the wall of the bolt. The spikes engage certain plates of the press to define their maximum movements.

4 Claims, 9 Drawing Figures

PLASTICS MOULDING PRESSES

This invention relates to moulding presses of the type in which articles are formed from plastics material. The article is usually made by injection-moulding, and is formed together with a deadhead (otherwise known as a sprue or moulding flash), the two being separated after cooling.

In such presses, injection takes place through a nozzle mounted in a fixed plate, the material being injected into a cavity defined between dies held by other plates. To permit opening and closing of the press and ejection of the article and deadhead, some of the plates are slidable relatively to the fixed plate on guide rods passing longitudinally through the press. Generally there are four guide rods, located one at each corner of the plates, which are rectangular.

To limit the extent of movement of one plate relatively to another, it is customary to provide a number of guide bolts. Such bolts are usually fixed at one end to a first plate and pass through an aperture in one or more other plates that are thus slidable on the bolt relatively to the first plate. An enlarged head is provided on the free end of the bolt, and abutment of a plate against the head defines the maximum movement of that plate relatively to the plate to which the other end of the bolt is fixed.

In presses having three movable plates (or three sets of plates, the plates of each set being joined rigidly to each other) in addition to the fixed plate and to certain ancillary plates on which are mounted ejector pins, it is not uncommon to have as many as eight such guide bolts located at different points in the press. This has the disadvantage of extreme complexity. Moreover, since the guide bolts and the guide rods all occupy space around the dies, it is difficult to gain access to the die cavity when the press is open for such purposes as to brush it in order to ensure that no particles of plastics material remain attached to it. It is customary to provide for such brushing in each operating cycle as a security measure, but the automation of the brushing operation is sometimes made difficult by the multiplicity of bolts.

An object of the invention is to provide a moulding press in which this disadvantage is substantially reduced by reducing the space occupied by the guide bolts.

The invention provides a moulding press having a plurality of plates and means to guide the plates for movement relatively to each other, such guide means including a guide bolt extending between at least two plates, with the improvement that the bolt is hollow and contains a sliding pin, the pin having at least two transverse elements protruding through slots in the bolt, each element being engageable with a plate to limit the movement of that plate relatively to another plate.

In a preferred form, there are a first plate to which one end of the bolt is connected, the bolt having a head on its free end, and a second plate and a third plate that are slidable on the bolt, the third plate being adapted to engage the head of the bolt to define the maximum gap between the first and the third plates, the pin having a first protruding element in the form of a spike that is fixed to the second plate and a second spike that is unconnected to any plate but is adapted to engage a seat in the third plate when the third plate approaches the head of the bolt on opening of the press, thereby to cause the pin and the second plate to be moved together with the third plate away from the first plate.

In practice the first plate is usually a fixed plate of the press.

An embodiment of the invention is described below with reference to the accompanying drawings, in which.

Figure 1:
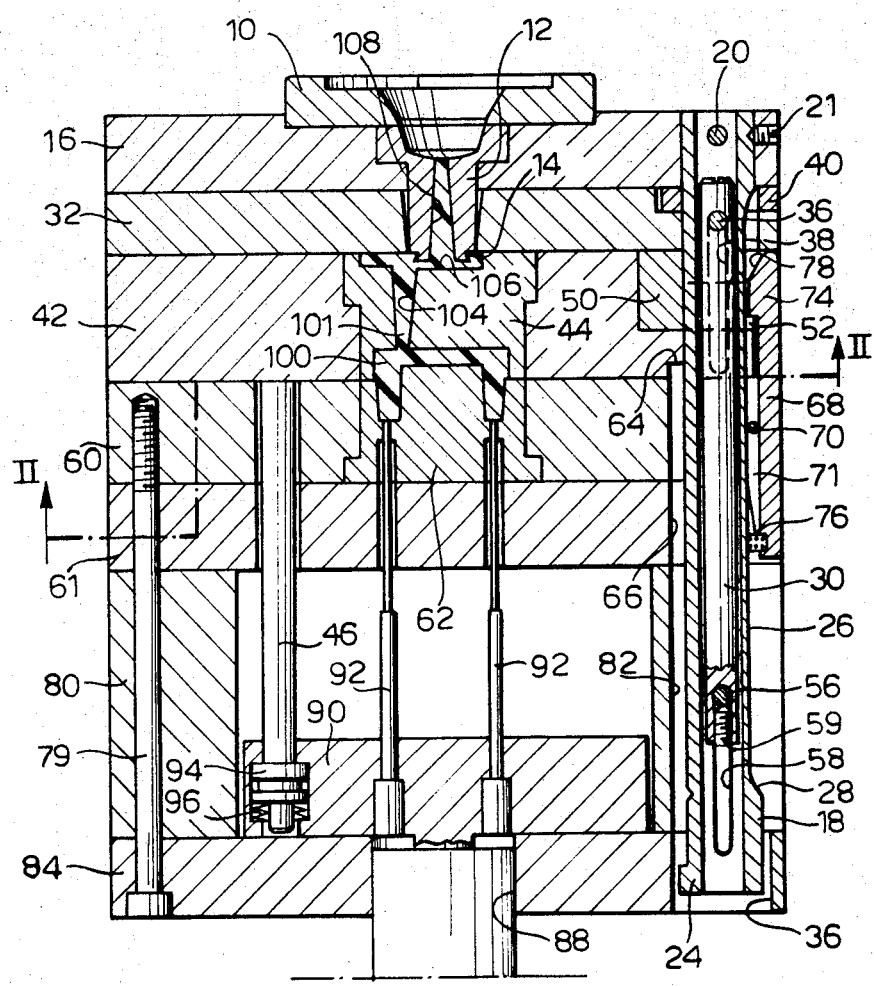
FIG. 1 is a simplified longitudinal sectioned view through the plates of a closed injection-moulding press, taken along the line I—I of FIG. 2.
Figure 8:
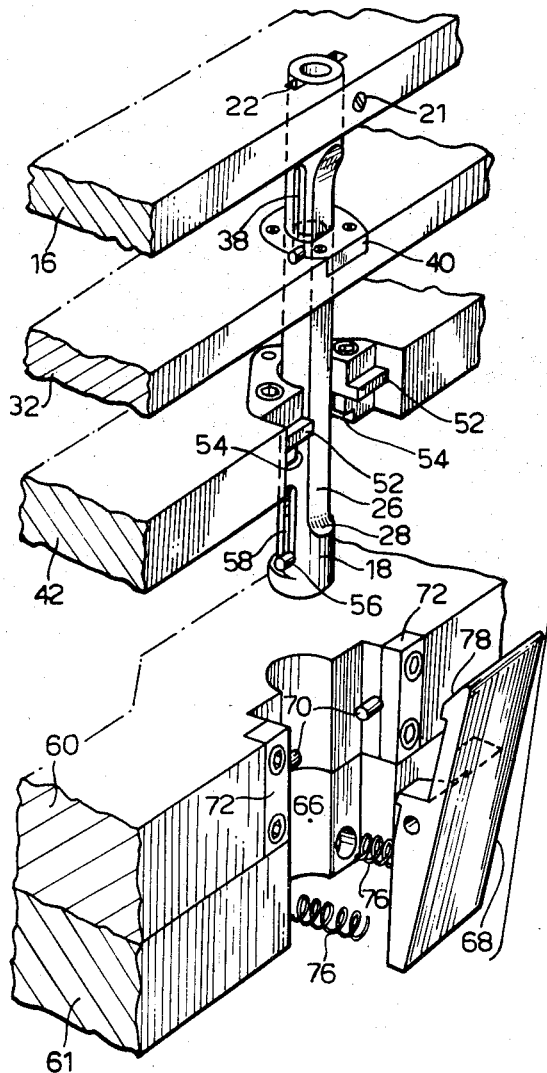
FIG. 8 is a fragmentary perspective view of a part of the press seen in FIGS. 1 to 7, arranged for purposes of illustration and not representing any phase in the operating cycle.

In FIG. 1, an injection-moulding press has the customary fixed backing plate 10 to which is attached a nozzle 12 for the injection of hot plastics material. The nozzle has a conventional undercut tip 14. Rigidly attached to the backing plate 10 is a fixed plate 16. Attached to the plate 16 at diametrically opposite points (FIG. 2) are two hollow guide bolts 18, each held against rotation in the press by a spike 20 (FIG. 1) which is rigid with the bolt 18 and seats in a groove 22 (FIG. 8) in the plate 16, and further held against movement by a grub screw 21 (FIGS. 1 and 8). The bolt 18 has an enlarged head 24 at its free end. The bolt 18 is otherwise of circular section, but has a longitudinal flat or land 26 (FIG. 8) on its radially outer surface, the flat 26 ending near the head 24 in a sloping cam 28. At its other end, the flat 26 extends to a position nearby the plate 16. Slidable within the cavity of the bolt 18 is a pin 30 (FIG. 1).

Figure 4:
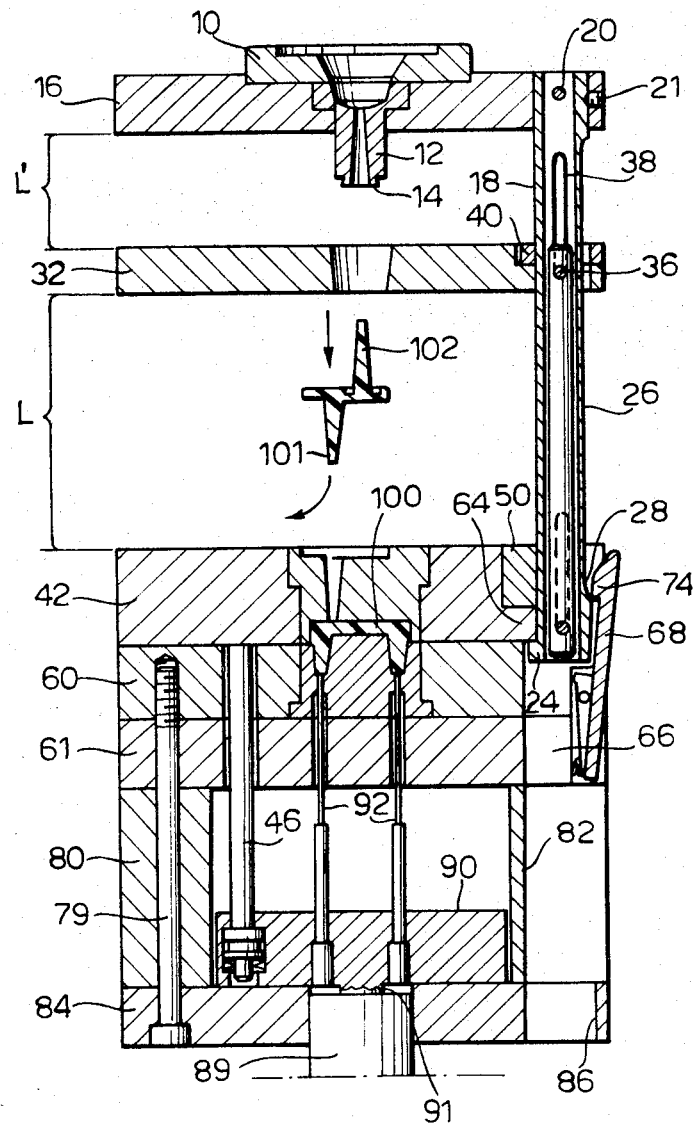

Flush with the plate 16 in FIG. 1 is a sliding plate 32 which has a central aperture accomodating the nozzle 12 and, for each bolt 18, a recess in which is seated a protruding element in the form of a spike 36. The spike 36 is solid with the pin 30 near one of its ends and extends transversely of it, projecting through two longitudinal slots 38 in the bolt 18. An insert plate 40 is fixed to the plate 32 to ensure that the spike 36 and hence the pin 30 are rigidly secured to the plate 32. The slots 38 allow sliding movement of the plate 32 on the bolts 18 between a position in which the plate 32 is flush with the plate 16 (FIG. 1) and a position in which the two plates are spaced apart by a distance L' (FIG. 4).

Flush with the plate 32 in FIG. 1 is a further plate 42 in which is held a female member 44 of the die of the press. Secured in a suitably shaped cavity in the plate 42 at each bolt 18 is a striking plate 50 having two teeth 52 (FIG. 8) whose purpose will be explained later.

Also formed in the plate 42 near each bolt 18 is a rebate or step 54 on which a spike 56 fixed in the pin 30 may abut, the spike 56 passing through longitudinal slots 58 in the bolt 18. The spike 56 is movable out of the rebate 54 when the plate 42 moves inwardly (i.e. towards the plate 16) on closure of the press, as will emerge more fully below. The spike 56 is held rigidly in position near the outer end of the pin 30 by means of a grub screw 59 (FIG. 1). The plate 41 also have a rebate 64 (FIG. 1) on which the head 24 of the bolt 18 can abut in certain positions of the press.

Figure 9:
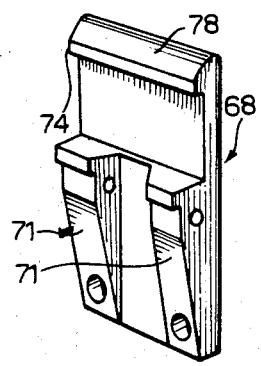
FIG. 9 is a perspective view from below of a hook used in the press of the preceding figures.

Outwardly of the plate 42 in FIG. 1 and flush with it is a further movable plate 60 in which is fixed the male die member 62. A plate 61 fixed to the plate 61 by bolts 79 holds the die member 62 firmly in place. The plate 60 is bored to allow the passage through itself of a pin 46 whose end abuts in FIG. 1 on the plate 42. A longitudinal cavity 66 is provided in the plates 60,61 to allow the passage of each bolt 18. The cavity 66 is also partly occupied by a hook 68 hinged to the body of the plate 60 by means of a pair of pivots 70 (FIG. 8) extending into flanges 71 (FIG. 9) on the undersurface of the hook 68. The pivots 70 allow oscillating movement of the hook 68 about a transverse axis. The pivots 70 are held in place by plates 72 (FIG. 8) screwed to the body of the plate 60. The hook 68 has a latch 74 (FIG. 9) which can engage the teeth 52 fixed on the plate 42. The hook 68 is biased into a position promoting such engagement by springs 76 that react on the plate 60. The end of the hook 68 carrying the latch 74 has an inclined face 78.

The plates 60,61 are rigidly connected by the bolts 79 (only one of which is seen) to an annular body 80 acting as a spacer and having a longitudinal groove 82 that is a continuation of the groove 66 in the plates 60,61. The body 80 is in turn rigidly connected by the bolts 79 to a plate 84 which has a bore 86 for each bolt 18, and a central bore 88 into which extends a fluid cylinder 89 having a piston shaft 91.

Accommodated in the cavity of the body 80 is an ancillary plate 90 to which the piston shaft 91 is connected and to which are rigidly fixed a number of ejector pins 92, the pins 92 being adapted to extend into the male die 62 for ejection of a formed article. The plate 90 is thus attached to and guided by the piston shaft 91 for longitudinal movement relatively to the plates 60,61 and 84. The plate 90 also receives an enlarged head 94 on the pin 46, together with a spring 96 which biases the pin 46 inwardly towards the plate 42 and takes up small inaccuracies in the dimensions of the components.

Figure 2:
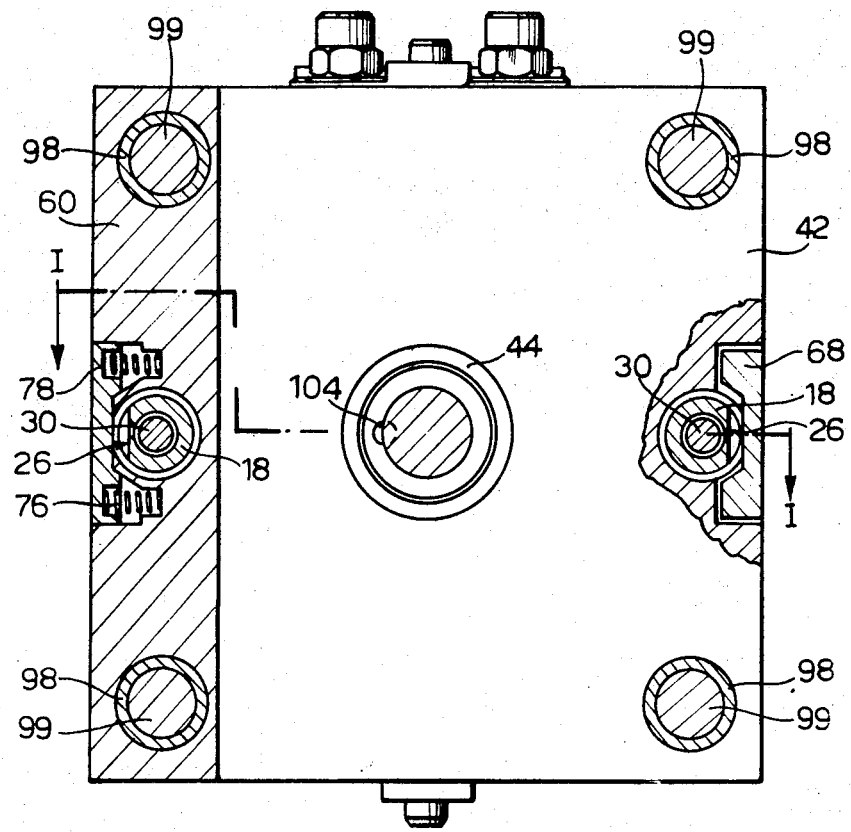
FIG. 2 is a view along the line II—II of FIG. 1, partly broken away to show interior details.

As seen in FIG. 2, the plates, 16,32,42,60,61,84 are pierced at their corners and receive hollow guide bushes 98 which keep these plates correctly aligned during their relative movements longitudinally in the press by co-operating with solid guide rods 99 fixed to one of the plates. For simplicity's sake the rods 99 are omitted in other drawings.

The male die 62 and the female die 44 define between them a cavity to receive a moulded article 100 connected by a narrow neck 101 to a deadhead 102 that is accommodated partly in a conical bore 104 (FIG. 1) in the female die 44, partly in a transverse cavity 106 in the same die 44 surrounding the tip of the nozzle 12, and partly within the cavity 108 of the nozzle 12.

OPERATION OF THE PRESS

After injection and cooling have taken place in the usual manner, the press is opened. This is done by applying traction to the plate 84 (FIG. 1) by customary means, not illustrated. The traction is transmitted through the body 80 to the plates 60,61 and the hook 68 and through the hook 68 to the plate 42. The cylinder 89, shaft 91 and plate 90 move with the plate 84 until an advanced stage in the opening cycle, as will be seen later. The spikes 36 and 56 are initially located at the ends of the slots 38 and 58 nearest the fixed plate 16.

Figure 3:
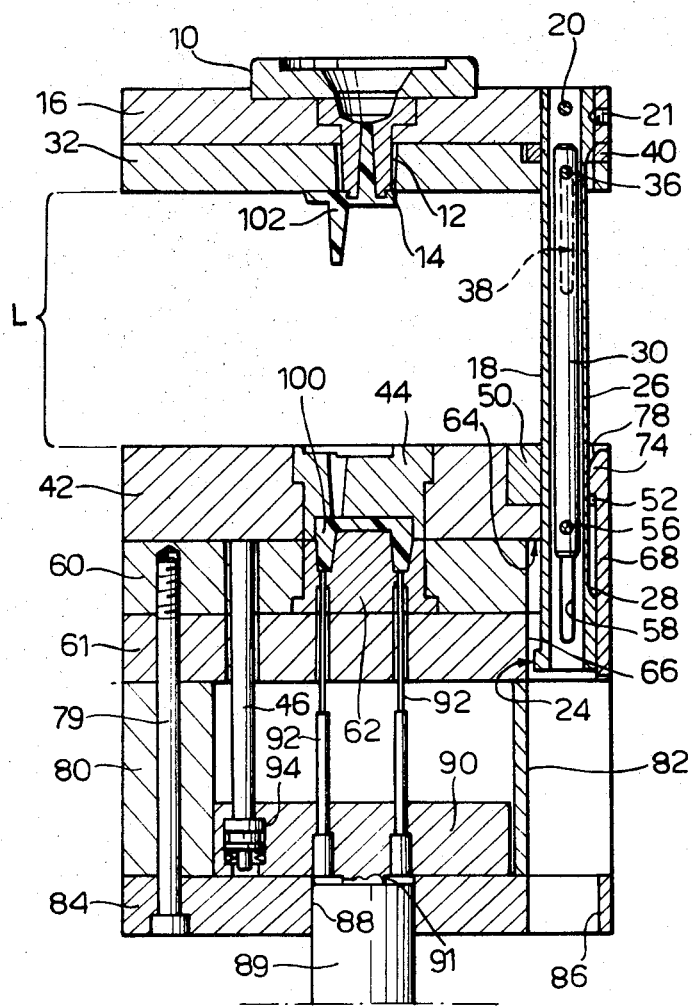
FIGS. 3 to 7 are views on a reduced scale of the press of FIG. 1, seen at intermediate phases in the operating cycle of the press.

The main phases in the opening cycle are seen in FIGS. 3 to 7. In FIG. 3, traction on the plate 84 has been transmitted to the plates 61,60 and 42, as mentioned above, drawing them outwardly by a distance L from the plate 32, which remains stationary since there is no tractive force acting on it. The narrow neck 101 of the deadhead 102 breaks, and the female die 44 separates from the deadhead, which remains in the nozzle 12 and is thus fixed relatively to the plate 32.

The full extent of the gap L is reached when the pin 56 abuts against the rebate 54 (FIG. 8) in the plate 50. At this stage the spikes 36 and 56 and the pin 30 have not moved in the bolt 18.

Further traction on the plate 84 brings about the situation seen in FIG. 4. Engagement of the spike 56 on the rebate 54 causes the spike 56 to be moved forward by a distance L' equal to the length of the slots 58 and 38. The pin 30 and spike 36 naturally move with the spike 56, and the plate 32 is correspondingly advanced by the distance L'. The deadhead 102 is forced forward, free of the undercut nozzle tip 14, and falls clear of the plates of the press.

At this stage the head 24 of the bolt 18 engages the rebate 64 on the plate 42, preventing further outward movement of the plate 42. Simultaneously, the latch 74 of the hook 68 rides up the cam surface 28 of the bolt 18 against the resistance of the springs 76. This releases the latch 74 from the teeth 52 and allows the plate 42 to separate from the plates 60 and 61, to reach the position seen in FIG. 5. The hook 68 naturally returns to its normal position under the action of the springs 76 when the latch 74 has cleared the end of the bolt 18. The plates 32 and 42 remain in the position seen in FIG. 4.

Figure 5:
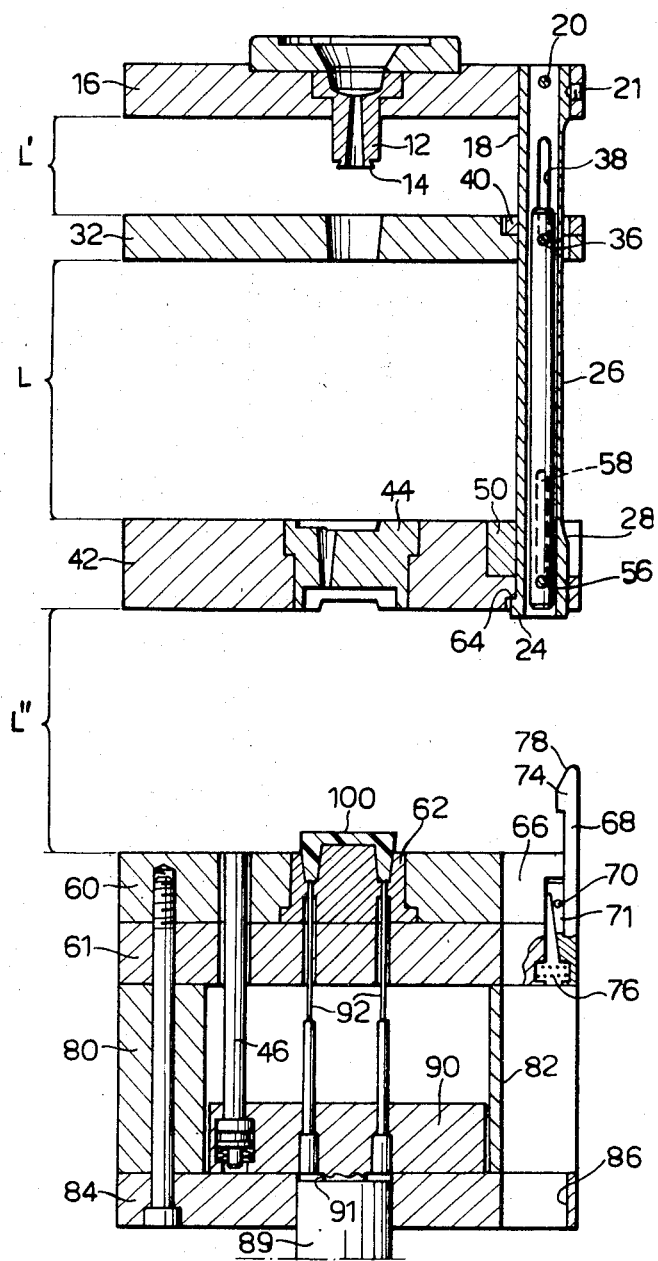

In FIG. 5, the die cavity is open. The article 100 adheres to the male die member 62 rather than to the female member 44 because of shrinkage of the article during cooling, and also, if necessary, by applying undercuts or other conformations to the male die member to cause the article to cling to it as the die members separate.

In FIG. 5, the plate 60 has advanced a distance L' from the plate 42, this distance being greater than the longitudinal length of the article 100.

Figure 6:
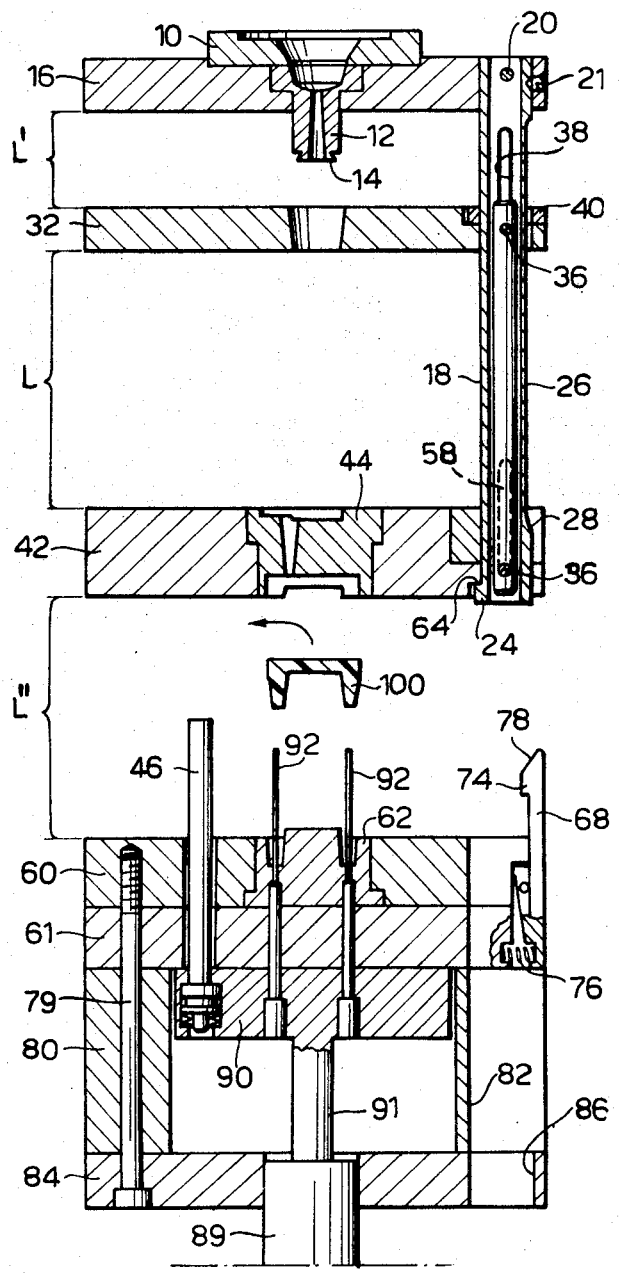

Ejection of the article 100 now takes place, as seen in FIG. 6, by advancing the piston 91 of the cylinder 89, so causing the plate 90 to move away from the plate 84 until it abuts against the plate 61. The ejector pins 92 force the article 100 out of the male die 62 and it falls clear of the plates of the press.

With the press fully open, as seen in FIG. 6, operations such as brushing of the plates may occur. Then the press is closed.

Closure begins by pushing the plate 84 inward, towards the plate 41. During the course of this movement the bolt 46 abuts against the plate 42 and causes the plate 90 to move back relatively to the plates 60,61 and 84 to its original position. As the plate 60 approaches the plate 42, the sloping face 78 of the hook 68 rides up the teeth 52 on the plate 42, so causing the latch 74 to engage the teeth 52 once again.

The gap L″ has then been closed and the position of FIG. 4 is restored, except of course that the die cavity is empty.

Figure 7:
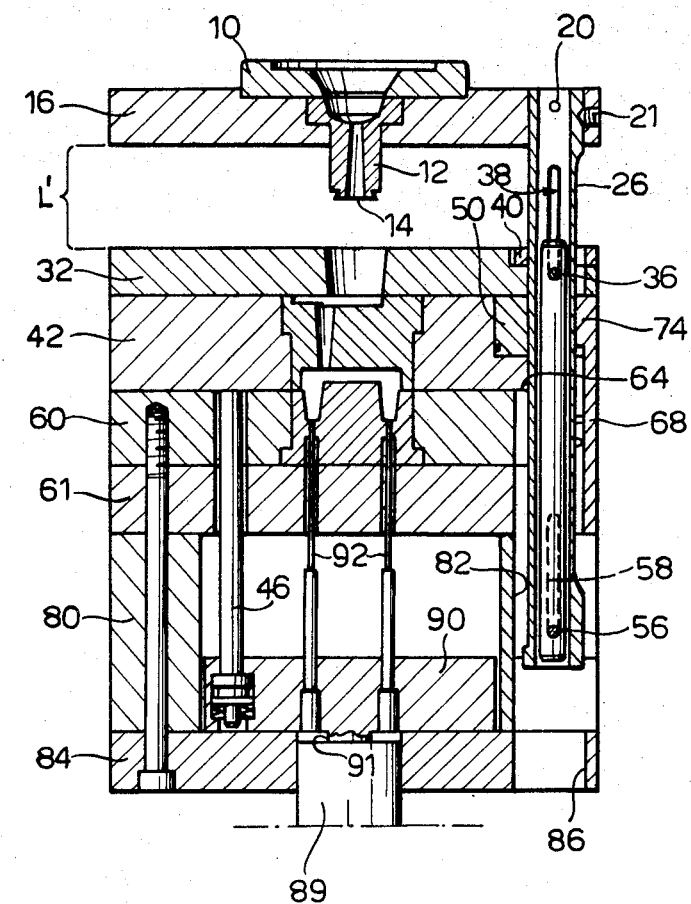

Further inward movement of the plates 84,61,60 and 42 closes the gap L and brings the press to the position seen in FIG. 7. As seen in that Figure, the spikes 36 and 56 and the pin 30 are still is their outermost position from the fixed plate 16.

Finally, inward pushing of the plates closes the gap L′ to to return the press to the position of FIG. 1. This movement also returns the pin 30 to its original position, and the press is then ready for the next cycle of injection.

It should be noticed in FIG. 8 that the gaps between the plates 16,32,42 and 60,61 have no significance, being chosen only for the sake of illustration.

SInce the pins 30 are located within the bolts 18, less space is occupied around the periphery of the dies 44,62 by the bolts 18 and pins 30 than would be occupied in conventional presses by bolts separate from the bolts 18 and performing the same function as the pins 30.

I claim:

1. A moulding press having a plurality of plates and means to guide the plates for movement relatively to each other, such guide means including a guide bolt extending between at least two plates, with the improvement that the bolt is hollow and contains a sliding pin, the pin having at least two transverse elements protruding through slots in the bolt, each element being engageable with a plate to limit the movement of that plate relatively to another plate.

2. The press of claim 1 having a first plate to which one end of the bolt is connected, the bolt having a head on its free end, and a second plate and a third plate that are slidable on the bolt, the third plate being adapted to engage the head of the bolt to define the maximum gap between the first plate and the third plate, and in which the pin has a first protruding element that is fixed to the second plate and a second such element that is unconnected to any plate but is adapted to engage a seat in the third plate during opening of the press, thereby to cause the pin and the second plate to be moved together with the third plate away from the first plate.

3. The press of claim 2, in which the first plate is a fixed plate of the press.

4. The press of claim 2, in which the third plate carries one member of a die of the press, and including a fourth plate carrying a second die member, the bolt having a cam at a point on its length and the fourth plate carrying a hook that engages a tooth on the third plate, the cam being located in the path of movement of the hook and being adapted, when the hook engages the cam, to disengage the hook from the tooth, so separating the third plate and fourth plate.

* * * * *